United States Patent [19]
Gupta

[11] Patent Number: 5,106,930
[45] Date of Patent: Apr. 21, 1992

[54] CONTACT LENSES

[75] Inventor: Amitava Gupta, Pasadena, Calif.

[73] Assignee: Ioptex Research Inc., Irwindale, Calif.

[21] Appl. No.: 383,802

[22] Filed: Jul. 21, 1989

Related U.S. Application Data

[63] Continuation-in-part of Ser. No. 251,199, Feb. 28, 1988, abandoned.

[51] Int. Cl.$^5$ .............................................. C08F 12/20
[52] U.S. Cl. ..................... 526/251; 526/279; 351/160 R
[58] Field of Search ................. 526/251, 279; 351/160 R

[56] References Cited

U.S. PATENT DOCUMENTS

| | | | |
|---|---|---|---|
| 2,945,003 | 7/1960 | Olson et al. | 526/251 |
| 3,467,634 | 9/1969 | Jacknew et al. | 526/251 |
| 3,808,178 | 4/1974 | Gaylord | 556/454 |
| 4,120,570 | 10/1978 | Gaylord | 526/279 |
| 4,327,202 | 4/1982 | Foley, Jr. | 526/251 |
| 4,420,225 | 12/1983 | Baner et al. | 526/251 |

FOREIGN PATENT DOCUMENTS

| | | | |
|---|---|---|---|
| 0214822 | 12/1984 | Japan | 526/251 |
| 8203397 | 10/1982 | World Int. Prop. O. | 526/251 |

*Primary Examiner*—Joseph L. Schofer
*Assistant Examiner*—N. Sarofim
*Attorney, Agent, or Firm*—Jacobs & Jacobs

[57] ABSTRACT

A contact lens material which is lipophobic, easily machined and is oxygen permeable which comprises a copolymer comprising from 25% to 50% by weight of a polysiloxanylalkyl ester of acrylic or methacrylic acid, from 40% to 69% by weight of a fluorinated styrene, from 4% to 7% of a hydrophilic monomer, from 2% to 5% of a suitable cross-linking agent and from 0% to 2% of a UV absorber.

20 Claims, 1 Drawing Sheet

CONTACT LENSES

This is a continuation-in-part of my copending application Ser. No. 251,199 filed Sep. 28, 1988 abandoned.

The present invention is concerned with contact lenses which are lipophobic, easily machined and oxygen permeable.

It is known in the art, according to U.S. Pat. Nos. 3,808,178 and 4,120,570 that polymeric materials may be used to fabricate contact lenses and have improved oxygen permeability, sufficient wettability to maintain a tear film, improved mechanical strength, and which are sufficiently rigid to permit precision machining and polishing. Such materials comprise a combination of a poly siloxanylalkyl ester of acrylic or methacrylic acid and an alkanol ester of an acrylic or methacrylic acid. Particular compositions comprising combinations of monomers and comonomers are disclosed.

While the contact lenses described in the above patents provide improved oxygen permeability, wettability, mechanical strength and machinability, in practice, it has been found that fats and lipoproteins in ocular fluids adhere to and limit the usefulness of such compositions as contact lens materials.

It is also known in the art that the adherence of lipids and other lipophilic (oleophilic) materials on a contact lens can be inhibited by making the contact lens material lipophobic. Generally speaking, the addition of fluorocarbons, such as polyacrylate or polymethacrylate esters derivatized with perfluorinated side groups will render a contact lens material lipophobic. However, the addition of fluorinated aliphatic esters or fluorinated polyethers to the polysiloxane contact lens materials described in U.S. Pat. Nos. 3,808,178 and 4,120,570 render the resulting contact lens material nonwettable and soft, hence unsuitable for the required machining processes associated with contact lenses, and subject to distortion in the eye. In order to render such a resulting lens material sufficiently wettable for contact lens applications requires a significant (greater than 6%) addition of a hydrophilic component, such as 2-hydroxyethyl methacrylate, mathacrylic acid, or 4-vinyl pyrrolidone. Unfortunately, such quantities of a hydrophilic component render the lens material hydrophilic, absorbing undesired quantities of water, proteins and metal ions. Also, the absorption of water undesirably increases the dimensions of the lens material. Accordingly, a need exists for a contact lens material having an optimum combination of high oxygen permeability, mechanical strength, machinability, wettability and improved lipophobicity. The present invention satisfies such a need. More particularly, the present invention comprises a contact lens which is lipophobic, easily machined and is oxygen permeable which comprises a copolymer comprising from 25% to 50% by weight of a polysiloxanylalkyl ester of acrylic or methacrylic acid, from 40% to 69% by weight of a fluorinated styrene, from 4% to 7% of a hydrophilic monomer, from 2% to 5% of a suitable cross-linking agent and from 0% to 2% of a UV absorber.

According to a further embodiment the contact lens comprises from 63% to 69% fluorinated styrene and wherein the UV absorber is absent.

According to a further embodiment the contact lens comprises from 63% to 67% fluorinated styrene and 2% by weight of a UV absorber.

According to a further embodiment the contact lens comprises from 44% to 50% fluorinated styrene and wherein the UV absorber is absent.

According to a further embodiment the contact lens comprises from 44% to 50% fluorinated styrene and 2% by weight of a UV absorber.

According to a further embodiment the poly siloxanylalkyl ester is an acrylate ester.

According to a further embodiment the poly siloxanylalkyl ester is a methacrylate ester.

According to a further embodiment the fluorinated styrene according to the present invention is mono-, di-, tri- or pentafluorinated styrene.

According to a further embodiment of the present invention the contact lens comprises from 63% to 69% mono- or di-fluorinated styrene when the UV absorber is not included. When the UV absorber is included in an amount of 2% by weight, the amount of fluorinated styrene present is 63% to 67% mono- or di- fluorinated styrene.

According to a further embodiment of the present invention, 42% to 69% trifluorinated styrene.

According to a further embodiment of the present invention a contact lens comprises at least 45% pentafluoro styrene.

According to a further embodiment of the present invention a contact lens comprises 42% to 69% pentafluoro styrene. Preferably it comprises 44% to 67% pentafluoro styrene.

According to a further embodiment of the present invention the hydrophilic monomer is methacrylic acid, vinyl pyrrolidone or hydroxyethylmethacrylate.

According to a further embodiment of the present invention the cross-linking agent is "SiX$_3$", ethylene glycol dimethacrylate or glycerol dimethacrylate. SiX$_3$ is a cross-linking agent of the formula:

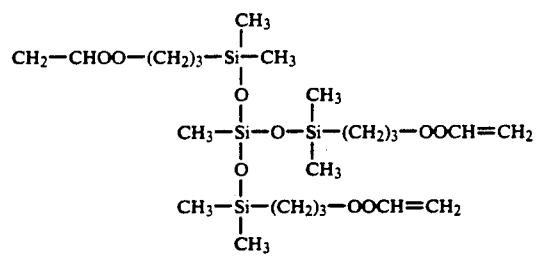

According to a further embodiment of the present invention the contact lens comprises 3-methacryloxypropyl tris-(tri-methylsiloxyl) silane, pentafluoro styrene and methacrylic acid.

According to a further embodiment of the present invention the contact lens comprises at least 45% by weight silane, and at least 5% methacrylic acid.

Any suitable ultraviolet absorber can be used in the contact lens of the present invention. Acryloxybenzophenone is a suitable UV absorber for use in the contact lenses of the present invention.

Figure 1:
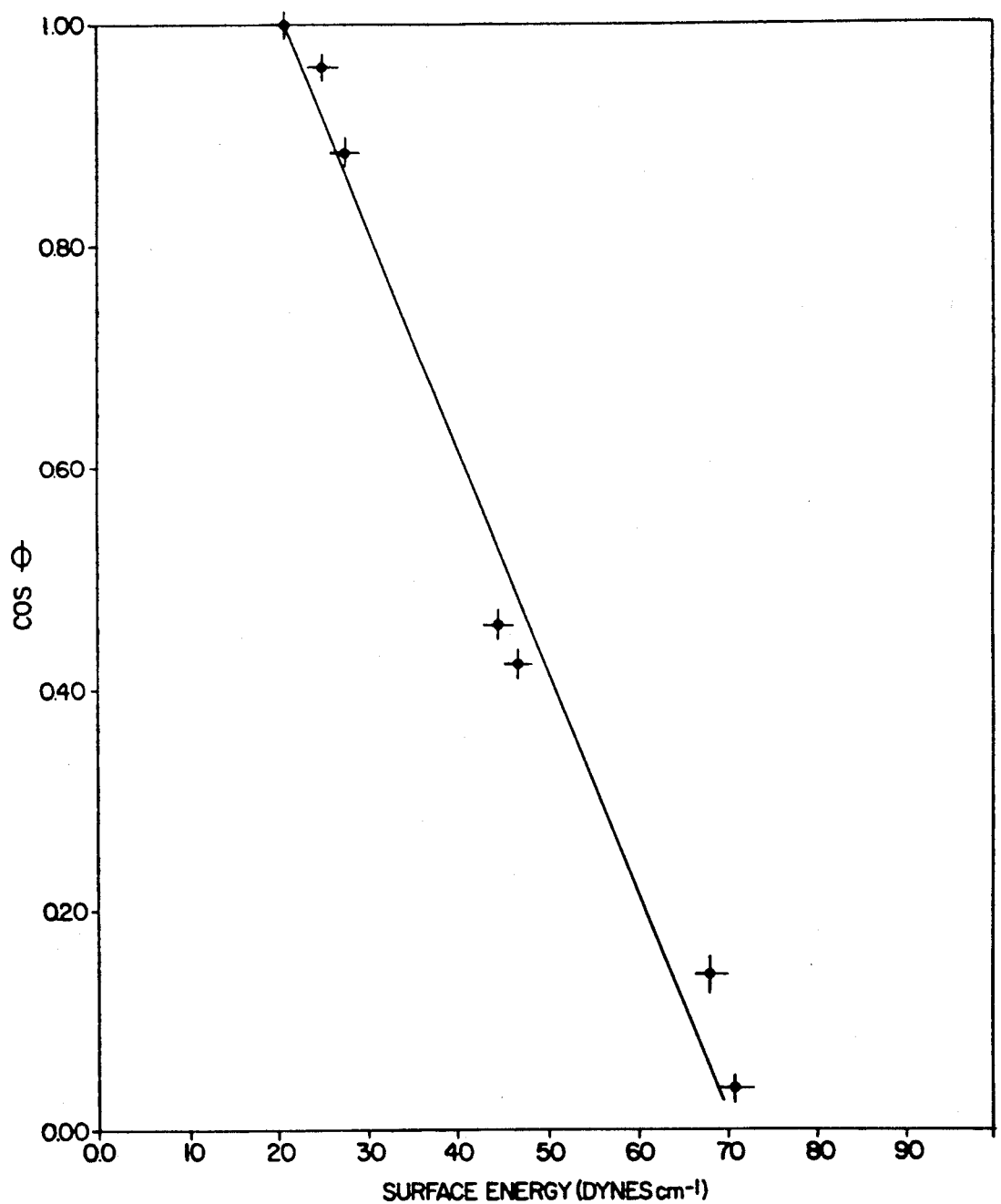
FIG. 1 is a Zissman Plot for the contact lens material present invention.

The following nonlimitative examples more particularly illustrate the present invention.

EXAMPLE 1

A contact lens according to the present invention was produced comprising 45% pentafluoro styrene, 45% 3-methacryloxypropyl tris-(tri-methylsiloxyl) silane, 5% methacrylic acid, 3% ethylene glycol dimethacrylate and 2% 2-hydroxy-4-ethoxyacryloxy benzophenone

EXAMPLE 2

A contact lens according to the present invention was produced comprising 44% pentafluoro styrene, 50% 3-methacryloxypropyl tris-(tri-methylsiloxyl) silane, 4% methacrylic acid, 2% ethylene glycol dimethacrylate and 2% 2-hydroxy-4-ethoxyacryloxy benzophenone.

EXAMPLE 3

A contact lens according to the present invention was produced comprising 61% pentafluoro styrene, 35% 3-methacryloxypropyl tris-(tri-methylsiloxyl) silane, 4% methacrylic acid, 2% ethylene glycol dimethacrylate and 2% 2-hydroxy-4-ethoxyacryloxy benzophenone.

EXAMPLE 4

The lenses of Examples 1-3 were produced as follows. The pentafluoro styrene and methacrylic acid were purified by vacuum distillation at 35° C. The first and last 10% of the fraction were discarded and the middle fraction retained for polymerization. A monomer mixture was then prepared by adding the silane and pentafluoro styrene methacrylic acid, a small amount of a free radical polymerization catalyst such as 2,2 azobisisobutyronitrile or 2,5-dimethyl 2,5 BIS(2-ethylhexoylperoxy) hexane, available as USP245 from Union Carbide Corporation (for example 0.5%), a cross-linking agent such as ethylene glycol dimethacrylate and a UV absorber such as 2-hydroxy-4-ethoxyacryloxy benzophenone. The monomer mixture was thoroughly deareated by vacuum degassing for 5 minutes with stirring, then maintained under a flow of dry high purity nitrogen gas. Polymerization was then carried out in a sealed glass tube for rod polymerization or between plates of tempered glass separated by a plastic (PVC) gasket for sheet polymerization. The polymerization was carried out in a convection oven at 65° C. for 20 hours followed by 1 hour at 100° C.

Following polymerization, the rods were cut and the sheets were cored to form 0.5 inch discs. The discs were then faced on a lathe to obtain thicknesses ranging from 0.1 mm to 0.4 mm and tested for oxygen permeability. Table 1 below sets forth the oxygen permeability measurements on the contact lens materials of examples 2 and 3:

TABLE 1

| Example No. | DK (cm$_2$/sec) ml O$_2$/ml × mm Hg) |
| --- | --- |
| 2 | 54 × 10$^{-11}$ |
| 3 | 153 × 10$^{-11}$ |

Contact angles were determined for the lenses of Examples 2 and 3 using water. Contact angles were measured by taking measurements immediately upon placing water drops on the surface and also after waiting for five minutes. Table 2 below provides the contact angles of the lenses of Examples 2 and 3:

TABLE 2

| | Contact Angles With Water | |
| --- | --- | --- |
| Example No. | Fresh Drop | 5 Minute Old Drop |
| 3 | 88 | 86 |
| 4 | 95 | 94 |

The contact lenses of the present invention not only exhibit improved oxygen permeability, but also have increased strength and machinability, as well as, improved lipophobicity as compared to prior art contact lenses. The contact lenses of the present invention repel fats that would otherwise adhere to the surface of the contact lens. Table 3 below sets forth the lipophobicity characteristics of the lens of Example 2.

TABLE 3

| Solvent | Contact Angle | Surface Tension |
| --- | --- | --- |
| n-Octane | 3 | 21.80 |
| Cyclohexane | 17 | 25.50 |
| Tolune | 28 | 28.50 |
| Bromonaphthalene | 63 | 44.60 |
| H$_2$O | 88 | 73.05 |
| Ethylene Glycol | 65 | 47.70 |
| Glycerol/H$_2$O | 82 | 70.00 |

The contact angle data set forth in Table 3 above was used to produce the Zissman Plot in FIG. 1. A straight line fitted through the data points gives the coherent surface energy of the lens of Example 3 as 2.16 dynes/cm.

What is claimed is:

1. A contact lens which is lipophobic, easily machined and is oxygen permeable which comprises a copolymer comprising from 25% to 50% by weight of a polysiloxanylalkyl ester of acrylic or methacrylic acid, from 40% to 69% by weight of a fluorinated styrene, from 4% to 7% of a hydrophilic monomer, from 2% to 5% of a suitable cross-linking agent and from 0% to 2% of a UV absorber.

2. A lens according to claim 1 which comprises from 63% to 69% fluorinated styrene and wherein the UV absorber is absent.

3. A lens according to claim 1 which comprises from 63% to 67% fluorinated styrene and 2% by weight of a UV absorber.

4. A lens according to claim 1 which comprises from 44% to 50% fluorinated styrene and wherein the UV absorber is absent.

5. A lens according to claim 1 which comprises from 44% to 50% fluorinated styrene and 2% by weight of a UV absorber.

6. A lens according to claim 1 wherein the poly siloxanylalkyl ester is an acrylate ester.

7. A lens according to claim 1 wherein the poly siloxanylalkyl ester is a methacrylate ester.

8. A lens according to claim 1 wherein the fluorinated styrene is monofluorinated styrene.

9. A lens according to claim 1 wherein the fluorinated styrene is difluorinated styrene.

10. A lens according to claim 1 wherein the fluorinated styrene is trifluorinated styrene.

11. A lens according to claim 1 wherein the fluorinated styrene is pentafluorinated styrene.

12. A lens according to claim 2 wherein the fluorinated styrene is a mono- or di- fluorinated styrene.

13. A lens according to claim 3 wherein the fluorinated styrene is a mono- or di- fluorinated styrene.

14. A lens according to claim 1 which comprises 42% to 69% trifluorinated styrene.

15. A lens according to claim 1 which comprises at least 45% pentafluorinated styrene.

16. A lens according to claim 1 which comprises 42% to 69% pentafluorinated styrene.

17. A lens according to claim 1 wherein the hydrophilic monomer is methacrylic acid, vinyl pyrrolidone or hydroxyethylmethacrylate.

18. A lens according to claim 1 wherein the cross-linking agent is $SiX_3$, ethylene glycol dimethacrylate or glycerol dimethacrylate.

19. A lens according to claim 1 which comprises 3-methacryloxypropyl tris-(tri-methylsiloxyl) silane, pentafluoro styrene and methacrylic acid.

20. A lens according to claim 1 which comprises at least 45% by weight silane, and at least 5% methacrylic acid.

* * * * *